(12) United States Patent
Dietz

(10) Patent No.: US 10,570,041 B2
(45) Date of Patent: Feb. 25, 2020

(54) TREATMENT OF IRON CONTAMINATED LIQUIDS WITH AN ACTIVATED IRON SOLIDS (AIS) PROCESS

(71) Applicant: Jonathan M. Dietz, State College, PA (US)

(72) Inventor: Jonathan M. Dietz, State College, PA (US)

( * ) Notice: Subject to any disclaimer, the term of this patent is extended or adjusted under 35 U.S.C. 154(b) by 584 days.

(21) Appl. No.: 13/970,242

(22) Filed: Aug. 19, 2013

(65) Prior Publication Data

US 2015/0048025 A1 Feb. 19, 2015

(51) Int. Cl.
*C02F 3/12* (2006.01)
*C02F 1/72* (2006.01)
(Continued)

(52) U.S. Cl.
CPC ............. *C02F 3/1263* (2013.01); *C02F 1/72* (2013.01); *C02F 3/006* (2013.01); *C02F 3/121* (2013.01); *C02F 3/1215* (2013.01); *C02F 3/346* (2013.01); *C02F 1/5236* (2013.01); *C02F 1/74* (2013.01); *C02F 2101/203* (2013.01); *C02F 2103/06* (2013.01); *C02F 2103/10* (2013.01); *C02F 2209/001* (2013.01); *C02F 2209/40* (2013.01); *C02F 2209/42* (2013.01); *C02F 2209/44* (2013.01); *Y02W 10/15* (2015.05)

(58) Field of Classification Search
CPC ....................................................... C02F 1/725
See application file for complete search history.

(56) References Cited

U.S. PATENT DOCUMENTS 3,684,485 A * 8/1972 Meyer ............................. 75/435
4,224,148 A    9/1980 Lindman et al.
(Continued)

OTHER PUBLICATIONS

Hedin, R. S. et al., "Passive Treatment of Acid Mine Drainage with Limestone", J. Environ. Qual., vol. 23, pp. 1338-1345, Nov.-Dec. 1994.

(Continued)

*Primary Examiner* — Ryan B Huang
(74) *Attorney, Agent, or Firm* — Michael G. Monyok; David G. Oberdick

(57) ABSTRACT

Method for treating iron-contaminated water using a treatment approach identified herein as the Activated Iron Solids (AIS) Process. The AIS process is capable of oxidizing and removing iron as iron oxides from iron-contaminated waters producing a clean effluent. The AIS process is performed in a single or multiple tank system in which high concentrations of AIS are suspended through mechanical mixing to maintain a catalytic surface chemistry environment that increases iron removal thousands times faster than would naturally occur and hundreds times faster than existing arts (e.g., aerobic pond passive treatment). The AIS process can utilize inexpensive alkaline material (such as, pulverized limestone) where initial mine drainage alkalinity (mg/L as $CaCO_3$) to ferrous iron (mg/L) ratio is less than approximately 1.7. Excess accumulated activated iron solids are periodically removed from the system using a waste-activated iron solids (WAIS) system and directed to an iron oxide thickener for further concentration.

18 Claims, 4 Drawing Sheets

Cross-Section View of the Two-Stage Flow-Through AIS Tank Assembly

Not-to-Scale
Tank Volume Varies

(51) Int. Cl.
*C02F 3/34* (2006.01)
*C02F 3/00* (2006.01)
*C02F 101/20* (2006.01)
*C02F 1/52* (2006.01)
*C02F 1/74* (2006.01)
*C02F 103/06* (2006.01)
*C02F 103/10* (2006.01)

(56) References Cited

U.S. PATENT DOCUMENTS

| | | | |
|---|---|---|---|
| 5,505,857 A | 4/1996 | Misra et al. | |
| 5,601,704 A | 2/1997 | Salem et al. | |
| 5,755,977 A * | 5/1998 | Gurol et al. | 210/759 |
| 5,954,969 A * | 9/1999 | Hedin | 210/709 |
| 6,214,237 B1 | 4/2001 | Kustra et al. | |
| 6,344,143 B1 | 2/2002 | Ahn et al. | |
| 6,660,163 B2 | 12/2003 | Miklos | |
| 6,773,593 B2 | 8/2004 | Young | |
| 2002/0053547 A1* | 5/2002 | Schlegel | B01D 53/02 210/688 |
| 2003/0222028 A1 | 12/2003 | Dietz | |
| 2006/0032821 A1 | 2/2006 | Dietz | |

OTHER PUBLICATIONS

Dietz, J.M., "Abiotic Heterogeneous Ferrous Iron Oxidation in Mine Drainage: Modeling and Treatment Processes", A Thesis in Environmental Engineering Submitted in Partial Fulfillment of the Requirements for the Degree of Doctor of Philosophy, Department of Civil & Environmental Engineering, Aug. 2003, The Pennsylvania State University, University Park, PA.

Tamura, H. et al. "Effect of Anions on the Oxygenation of Ferrous Ion in Neutral Solutions", Journal of Inorganic Nuclear and Chemistry, vol. 38, pp. 113-117, 1976.

Dietz, J. M. and Dempsey, B. A., "Treatment of Mine Drainage Using Recirculated Iron Oxides in a Complete Mix Reactor", presented at the 2001 National Association of Abandoned Mine Lands Annual Conference, Aug. 19-22, 2001, Athens, Ohio.

Dempsey, B.A., & Jeon, B-H. "Characteristics of Sludge Produced from Passive Treatment of Mine Drainage" Geochemistry: Exploration, Environment, Analysis, vol. 2, 2001, pp. 1-6, 1467-7873/01/$15.00c2001, AEG/Geological Society, London.

Tamura, H., Goto, K. and Nagayama, M., "The Effect of Ferric Hydroxide on the Oxygenation of Ferrous Ions in Neutral Solutions", Corrosion Science, 1976, vol. 16, pp. 197-207, Pergamon Press, Printed in Great Britain.

Chou, L., Garrels, R. and Wollast, R., "Comparative study of the kinetics and mechanisms of dissolution of carbonate minerals", Chemical Geology, 78 (1989) 269-282, Elsevier Science Publishers B.V., Amsterdam, printed in The Netherlands.

Pearson, F. and McDonnell, A., "Use of Crushed Limestone to Neutralize Acid Wastes", Journal of the Environmental Engineering Division, Feb. 1975, pp. 139-158.

Hedin, R. and Watzlaf, G., "The Effects of Anoxic Limestone Drains on Mine Water Chemistry", presented at International Land Reclamation & Mine Drainage Conference and Third International Conference on Abatement of Acidic Drainage, Pittsburgh, PA, Apr. 24-29, 1994, pp. 185-194.

Millero, F., Sotolongo, S. and Izaguirre, M., "The Oxidation Kinetics of Fe(II) in Seawater", Geochimica et Cosmochimica Acta, vol. 51, pp. 793-801, Pergamon Journals Ltd. 1987.

Hedin, R.S., & Nairn, R.W. 1993. Contaminant Removal Capabilities of Wetlands Constructed to Treat Coal Mine Drainage. p. 187-195. In G.A. Moshiri (ed.), Constructed Wetlands for Water Quality Improvements. Lewis Publishers, Boca Raton, Florida, USA.Stumm, W. & Morgan, J.J. 1996. Aquatic Chemistry, 3rd Ed. (pp. 683-691), John Wiley & Sons, Inc., New York, USA.

Office Action for U.S. Appl. No. 11/211,260 dated Nov. 16, 2006.
Office Action for U.S. Appl. No. 11/211,260 dated Jul. 31, 2007.
Office Action for U.S. Appl. No. 11/211,260 dated Mar. 12, 2008.
Office Action for U.S. Appl. No. 10/453,127 dated Nov. 19, 2004.
Office Action for U.S. Appl. No. 10/453,127 dated Mar. 29, 2005.
Office Action for U.S. Appl. No. 10/453,127 dated Apr. 12, 2006.
Office Action for U.S. Appl. No. 10/453,127 dated Nov. 16, 2006.
Office Action for U.S. Appl. No. 12/283,525 dated Jan. 21, 2011.
Office Action for U.S. Appl. No. 12/283,525 dated Apr. 6, 2011.
Office Action for U.S. Appl. No. 12/283,525 dated Nov. 2, 2011.

* cited by examiner

TREATMENT OF IRON CONTAMINATED LIQUIDS WITH AN ACTIVATED IRON SOLIDS (AIS) PROCESS

CROSS REFERENCE TO RELATED APPLICATIONS

The present invention is a Divisional application of U.S. Non-provisional application Ser. No. 12/283,525 entitled "TREATMENT OF IRON CONTAMINATED LIQUIDS WITH AN ACTIVATED IRON SOLIDS (AIS) PROCESS" filed on Sep. 12, 2008, which is a continuation-in-part of U.S. Non-provisional application Ser. No. 11/211,260, filed on Nov. 2, 2005, now abandoned, itself a continuation-in-part of U.S. Non-provisional application Ser. No. 10/453,127, filed on Jun. 3, 2003, now abandoned, the latter having claimed priority from U.S. Provisional application Ser. No. 60/384,680, filed on Jun. 3, 2002 and entitled "A Process and Device for Treating Iron Contaminated Liquids," all of which are incorporated by reference.

BACKGROUND OF THE INVENTION

1. Field of the Invention

This invention relates generally to a device and method for and the treatment of iron-contaminated fluid (e.g., mining-related discharge, groundwater, surface water and industrial waste streams) and, more particularly, to an apparatus and method for oxidizing and removing ferrous iron from iron-contaminated fluid, including mine drainage, and producing an effluent substantially free of iron.

2. Description of the Prior Art

Iron-contaminated water results from a variety of natural and anthropogenic processes with the latter typically involving mining and industrial processing. Ferrous iron is released from minerals (e.g., pyrite, siderite, and hematite) through dissolution and redox processes. Industrial processing typically involves formation of reduced iron)($Fe^0$) into various metallic compounds, with waste streams or subsequent oxidation causing elevated ferrous iron levels.

The most common source of iron-contaminated water results from mineral extraction and can be produced from either surface or deep mining practices where iron sulfide minerals contained in the minerals and surrounding formations are oxidized. The chemistry of mine drainage will vary depending on overburden characteristics and mining and reclamation techniques. In the United States millions of gallons of mine drainage is produced daily from both active and abandoned mine sites. Treating mine drainage is an expensive endeavor involving land, construction, materials, operation, maintenance and chemical costs. Left untreated, mine drainage contaminate surface and groundwater causing impacts to their social, recreational and commercial uses.

Iron is removed from iron-contaminated waters employing chemical and passive treatment technologies. Current chemical treatment, more commonly used for industrial sources and active mines, requires continuous metering of caustic chemicals (e.g., quick lime, hydrated lime or soda ash) to raise the pH above 8 thereby increasing the rate of iron oxidation and precipitation as oxides (USEPA 1981). In addition to chemical additives, active treatment requires an assorted array of pumps, aeration equipment and multiple oxidation and settling basins. Iron oxide solids produced in chemical treatment are low density (1 to 4% solids) and highly contaminated with calcium, aluminum, manganese, and sodium deposits (Dempsey & Jeon 2001). The low-density solids slowly settle in large open water basins or clarifiers, which require frequent and costly maintenance to remove and dispose the accumulated solids.

Passive treatment systems rely on natural amelioration processes that do not require pumps or metered chemical additions. In general, mine drainage passes through open water ponds and/or aerobic wetlands where abiotic and biotic processes contribute to the oxidation and precipitation of iron (Hedin & Nairn 1993). Iron removal in passive treatment systems require much larger land areas (10 to 20 times greater) than chemical treatment, which can become excessive for high flow and/or high iron concentration mine drainage discharges. In addition, iron removal in passive systems can be problematic with performance varying with season, influent flow and iron concentration, and alkalinity in the mine drainage. Iron oxide solids produced by passive treatment systems have much higher sludge density (15-30%) than chemical treatment and are frequently less contaminated (Dempsey & Jeon, 2001). Reported iron oxide content in passive treatment solids varies from 50 to 90%.

AIS-treated waters produce a unique iron oxide sludge that (1) settles at a rate faster than either chemically or passively produced solids; (2) is a high-density sludge with solids of approximately 30%; and (3) is a high-purity sludge with iron oxide content exceeding 95%. The prior art does not address the unique solids content of AIS-treated fluids.

Ferrous iron oxidation is usually the limiting step in the iron removal from iron-contaminated mine drainage. Iron oxidation has been described to occur by two separate processes known as homogeneous oxidation, a solution oxidation process, and heterogeneous oxidation, a solid/solution interface oxidation process. Homogeneous oxidation involves soluble $Fe^{2+}$, $FeOH^+$, or $Fe(OH)_2^O$ species in the presence of dissolved oxygen (Stumm & Morgan 1996). This oxidation is strongly dependent on pH with slow oxidation occurring at pH 6 and rapid oxidation occurring above pH 8. Heterogeneous oxidation involves sorbed ferrous iron on the surface of iron oxides in which the iron oxide acts as a catalyst (Dietz 2003 and Tamura & Nagayama 1976). At high suspended iron oxide concentrations, heterogeneous oxidation has been found to produce oxidation rates greater than 100 times the rates observed in passive treatment and comparable rates to chemical treatment (Dietz 2003, and Dietz & Dempsey 2001)). Heterogeneous ferrous iron oxidation (HeFIO) is described by the following model:

$$\frac{\partial [Fe(II)]}{\partial t} = -\left(k_{He1} \times [DO] \times \frac{1 + ([Fe(II)_{diss}] \times K_1^{app})}{[\equiv Fe(III)] \times \Gamma_1 \times \{H^+\}^1}\right) - $$
$$\left(k_{He2} \times [DO] \times \frac{1 + ([Fe(II)_{diss}] \times K_2^{app})}{[\equiv Fe(III)] \times \Gamma_2 \times \{H^+\}^2}\right)$$

$$pK_{x,T2}^{app} = pK_{x,T1}^{app} - \left(\frac{\Delta H_{rxn,X}^0}{2.303 \times R} \times \frac{T_2 - T_1}{T_2 \times T_1}\right)$$

$$pk_{Hex,T2} = pk_{Hex,T1} - \left(\frac{E_{a,x}}{2.303 \times R} \times \frac{T_2 - T_1}{T_2 \times T_1}\right)$$

Summary of parameters and constants in the ferrous iron sorption heterogeneous ferrous iron oxidation (HetOX) models.

| Model Parameter | Description | Sub-Model (x = 1) | Sub-Model (x = 2) |
|---|---|---|---|
| [Fe(II)] | Ferrous Iron Concentration, molar | varies | Varies |

-continued

Summary of parameters and constants in the ferrous iron sorption heterogeneous ferrous iron oxidation (HetOX) models.

| Model Parameter | Description | Sub-Model (x = 1) | Sub-Model (x = 2) |
|---|---|---|---|
| $\partial[Fe(II)]/\partial t$ | Ferrous Iron Oxidation Rate | varies | varies |
| [DO] | Dissolved Oxygen Concentration, molar | varies | varies |
| $[Fe(II)]_{diss}$ | Dissolved Fraction of Ferrous Iron, molar | varies | varies |
| [=Fe(III)] | Suspended AIS as Ferric Iron Concentration, g/L | varies | varies |
| $\{H^+\}$ | Hydrogen Ion Activity, molar $\{H^+\} = 10^{-pH}$ | varies | varies |
| $k_{Hex}$ ($M^{-1} s^{-1}$) | Oxidation Rate Constant | 0.105 | 38.0 |
| $E_{a,x}$ (kJ/mol) | Activation Energy of Oxidation Reaction | 60.7 | 60.7 |
| $K_x^{app}$ ($M^{x-1}$) | Surface Complexation Constant | $10^{-1.265}$ | $10^{-10.78}$ |
| $\Gamma_x$ (mol/mol) | Sorption Site Density | 0.0045 | 0.212 |
| $\Delta H^0_{rxn,x}$ (kJ/mol) | Enthalpy of Sorption Reaction | 69.0 | 96.2 |
| $\{H^+\}$ Coefficient (x) | Hydrogen Ion Coefficient | 1 | 2 |

Homogeneous oxidation is by far the dominant process in both chemical and passive treatment, typically accounting for greater than 95% of the oxidation. This occurs because (1) chemical treatment occurs at high pH where homogeneous oxidation is by far the fastest oxidation either with or without suspended iron oxide solids; and (2) passive treatment is a non-mechanical approach that does not allow for the suspension of high concentrations of iron oxide (>200 mg/L) that would be needed to have heterogeneous oxidation dominate ferrous iron oxidation.

Alkalinity may need to be generated to complete the precipitation of oxidized ferrous iron where the source water alkalinity (mg/L as $CaCO_3$) to iron (mg/L as Fe) ratio is less than about 1.7. The low pH (approximately 5 to 6) and/or high carbonic acid concentrations ($P_{CO2}$ approximately 0.1 to 0.5) found in many iron-contaminated waters (i.e., mine drainage) results in the rapid dissolution of carbonate minerals (such as calcite), thereby producing alkalinity at concentrations higher than will typically occur in natural systems. A type of passive treatment, known as Anoxic Limestone Drains (ALD), has been found to produce alkalinity greater than 300 mg/L (Hedin et al 1994). Other research has found carbonate dissolution occurs rapidly until pH greater than 6 is achieved and the rate of dissolution is directly proportional to the surface area of the carbonate mineral present (Amrhein et al 1985; Pearson & McDonnell 1974). Testing done with a relatively unused material, pulverized limestone, in AIS treatment has been shown to adequately address the alkalinity issue due to rapid dissolution of the carbonate in the high ferrous oxidation reaction rate environment of AIS in combination with the complete mixing in the AIS reactor.

Therefore, it is an object of this invention to provide treatment processes and apparatus for oxidizing and removing ferrous iron from iron-contaminated mine waters at pH (less than 7) typically found in iron-contaminated waters.

Another object of this invention is to oxidize and remove ferrous iron from iron-contaminated waters by using the higher oxidation rates supported by heterogeneous oxidation through mechanical suspension of high particulate iron oxide concentrations (i.e., >200 mg/L) and providing a source of alkalinity where inadequate alkalinity is present to complete the oxidation and precipitation of iron.

It is also an object of this invention to develop a simple means of collecting and concentrating the iron oxides produced by the iron-contaminated liquid treatment processes and apparatuses.

Other objects will be readily apparent after reading the description and reviewing the figures described below.

SUMMARY OF THE INVENTION

The invention involves an apparatus consisting of a single tank or multiple tank assembly (in series or parallel), each tank constructed of steel, reinforced concrete, or plastic and containing: (i) mechanical aeration (e.g., Gardner Denver/Sutorbilt positive displacement blower, electric motor providing air to fine or coarse bubble diffusers) and/or (ii) mixing apparatus (e.g., Lightnin Mixers with shafts and impellers) for maintaining oxygenated water and a suspension of high concentrations of particulate iron oxides (>200 mg/L). For a sequencing batch reactor (SBR) apparatus, the tank assembly would also contain storage capacity in the bottom of said tank for activated iron solids (AIS). This invention also involves a method of concentrating iron oxides in the reactor through settling, time and/or flow-based process controls (e.g., Nemar, Inc. Automation Systems and Controls), and a waste activated iron solids (WAIS) apparatus (e.g., Goulds submersible pump). For a flow through reactor (FTR) apparatus, the tank assembly would include a flocculator/clarifier (e.g., WESCO lamella clarifier) to collect and store activated iron solids (AIS) and a return/waste activated iron solids (RAIS & WAIS) apparatus (e.g., Seepex Inc. Sludge pump) with flow-based process controls (e.g., Nemar, Inc. Automation Systems and Controls).

The invention also includes: apparatus (e.g., Kraus vibratory doser) to add alkaline material (such as, pulverized calcite limestone) directly to the tank assembly when additional alkalinity is needed to complete the ferrous iron oxidation and precipitation reactions; and a separate container assembly to thicken iron oxides produced by the treatment process. The invention has the capacity to discharge substantially iron free water with circumneutral pH (a pH between 6.0 and 7.5).

The following description will provide a complete understanding of the invention when reviewed in connection with the accompanying drawing figures.

DETAILED DESCRIPTION OF THE INVENTION

As used herein, the term "heterogeneous reaction" is defined as a reaction involving two or more phases, i.e., solid, liquid and/or gas. In the case of heterogeneous iron oxidation, the reaction involves a ferrous iron solution and an iron oxide solid where ferrous iron is sorbed from the solution and oxidized on iron oxide at the solid/solution interface. See, Sung, W. and J. J. Morgan, "Kinetics and product of ferrous iron oxygenation in aqueous systems", Environ. Sci. & Tech. 14(5): 561-567 (1980).

Figure 1:
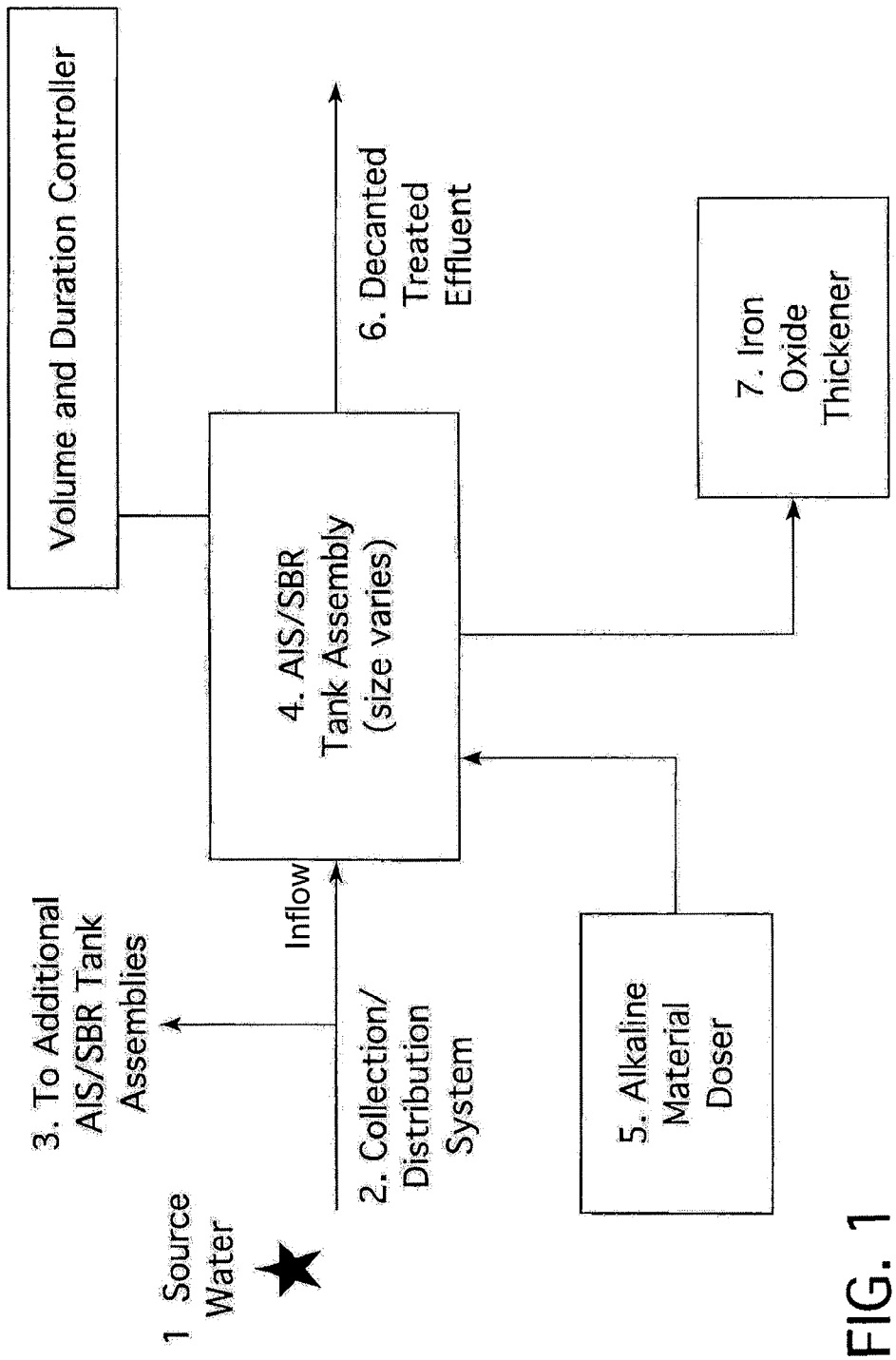
FIG. 1 is a schematic plan view of a Sequencing Batch Reactor treatment system for oxidizing and removing ferrous iron from a flow of iron-contaminated mine water.

FIG. 1 is a plan view of the treatment system. An iron-contaminated water source 1 is directed into a least one AIS tank assembly 4 or more preferably a plurality of AIS container assemblies. The means of directing the iron-contaminated water into at least one AIS tank assembly may be by gravitational force or by pumping the iron-contaminated liquid into the AIS tank assembly. When a plurality of AIS container assemblies are used in the treatment of iron-contaminated water, a means for collecting and distributing the iron-contaminated water, such as a header system or distribution tank assembly, precedes the AIS tank assembly 3.

Figure 2:
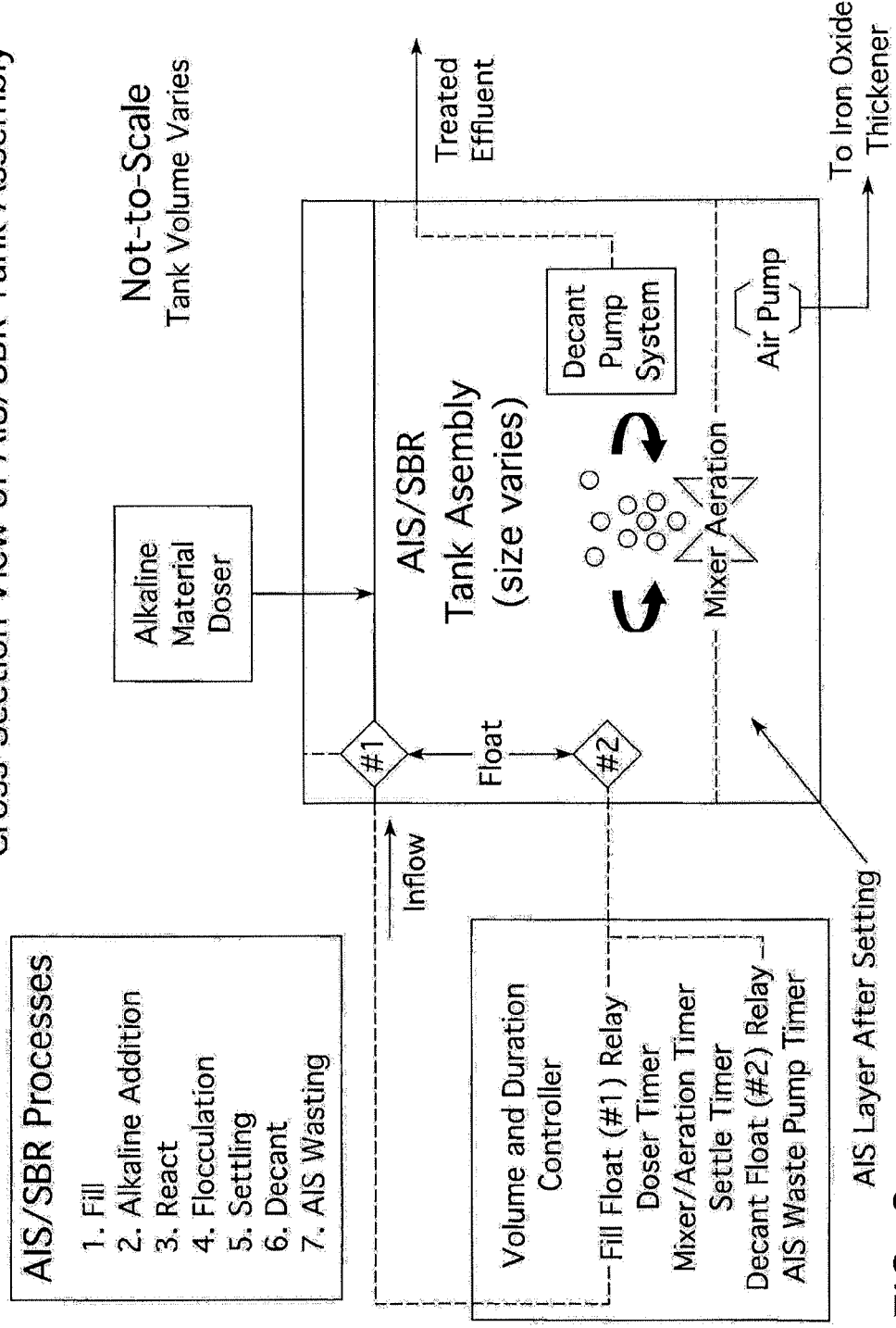
FIG. 2 is a schematic cross-sectional view of embodiment of sequencing batch reactor (SBR) tank assembly of FIG. 1.

The source of iron-contaminated fluid is directed through a first conduit 2 that is engaged with the inlet of the AIS tank assembly 4 or a plurality of AIS container assemblies 3. Each AIS tank assembly in a plurality of AIS tank assemblies is identical as shown in FIG. 2, a cross-section view of said AIS container assembly. FIG. 2 is a sequencing batch reactor (SBR) tank assembly where all processes (fill, aeration/mixing, flocculation, settling, AIS retention, decant, and AIS wasting) occur sequentially within one (1) tank assembly. A two-stage flow-through tank assembly (see FIGS. 3 and 4) can have (1) at least two completely stirred reactors (CSTR) in series; (2) a clarification tank assembly following the two-stage flow-through tank assembly to collect AIS; and (3) a conduit system connected to the clarifier to re-circulate AIS to the first tank in the two-stage flow-through tank assembly and to direct waste AIS for further handling or disposal.

A sequencing batch reactor (SBR) tank assembly system of the present invention has the following features:

1) A means for directing the fluid to be treated into a tank assembly having the features described herein;

2) A means of aeration (e.g., Gardner Denver/Sutorbilt positive displacement blower, electric motor providing air to fine or coarse bubble diffusers) and mixing (e.g., Lightnin Mixers with shafts and impellers) within the tank assembly to provide sufficient oxygen for ferrous iron oxidation, carbon dioxide removal for optimal pH operation, and suspension of the activated iron solids (AIS) in the tank assembly at iron oxide concentrations greater than 200 mg/L;

3) A means of storing (e.g., the bottom of the tank for SBR or bottom of clarifier for the two-stage flow-through system) or re-circulating AIS (e.g., Seepex progressive cavity pump) within the tank assembly to maintain sufficiently high reactor iron oxide concentrations (>200 mg/L) to catalyze ferrous iron oxidation by the heterogeneous oxidation process;

4) A means of decanting (e.g., Goulds submersible pump) or overflow from the tank assembly to remove treated iron-contaminated fluid;

5) A means to remove excess (e.g., Goulds submersible pump or Seepex progressive cavity pump) iron oxides from the tank assembly; and 6) A means of controlling (such as a processor or controller) the duration of the various container assembly processes such as fill, reaction, flocculation, settling and decant. Such means include any of the commercially available means (e.g., the Tork adjustable cycle timer, the Tyco Time Delay Relays, the Ametek National Controls Corporation Multi-range Delay on Break or the Grasslin Timemaster GMX Series 24 hr 7 day cycle timer).

One representative system employed a Control Panel made and sold by Purestream, Inc., with Timers made and sold by Crouzet, a company of Schneider Electric connected thereto. Included in the SBR Tank assembly were two representative Floats, Float #1 made and sold by Conery Manufacturing Inc. and Float #2 made and sold by Conery Manufacturing, Inc. The Decant Pump System employed therewith was Model No. 3888D3, made and sold by Goulds Pumps, ITT Corporation.

The control panel employed in one representative system assists in treatment by process control involving the timers and floats operating electrical relays in the control panel to turn on and off mechanical blowers, mixers and pumps. During the heterogeneous ferrous iron reaction cycle, the timers and relays turn on blowers and mixers to provide aeration and suspension of iron oxide solids with the reaction cycle determined based on the duration required to achieve the required ferrous iron oxidation. It is the suspension and re-suspension of elevated iron oxide solid concentrations through mechanical means that causes heterogeneous ferrous iron oxidation and distinguishes this invention from the homogeneous system patented by Hedin.

After the reaction cycle, the timers turn off the blowers and mixers resulting in a quiescent period to allow the iron oxides solid suspension to settle to the bottom of the container where the solids are stored for subsequent reaction cycles or wasted to prevent excess accumulation of iron oxide solids. Excess iron oxide solids are removed from the container using a timer operated waste pump. After the required settling time, a timer turns on a floating decant pump to remove the ferrous iron treated and iron oxide settled water. The decant pump removes treated water to a preset water level as established by the float switch and at a level that does not remove settled iron oxide solids stored in the bottom of the container. Once this preset water level is met, the float switch turns off the decant pump. This same float switch also turns on a fill pump or opens a valve to refill the container with untreated water to a preset water level as established by a float switch. The float switch engages the reaction timers (blowers and mixers) initiating a new treatment cycle. The treatment process is continuously operated by the control panel.

The method of the present invention includes the following steps: 1) Directing an iron-contaminated fluid to be treated into a tank assembly having the features described herein; 2) Aerating and mixing iron-contaminated fluid within a container assembly to provide sufficient oxygen for ferrous iron oxidation, carbon dioxide removal, and suspension of the activated iron solids (AIS) in solution to maintain reactor iron oxide concentrations necessary to catalyze ferrous iron oxidation; 3) Settling and storing AIS within the container assembly; 4) Decanting between 40 and 70% of the container volume assembly to remove treated iron-contaminated fluid, but retain stored AIS in the container assembly; 5) Removing excess iron oxides from the container assembly; 6) re-starting the process through directing new iron-contaminated fluid to the tank assembly and AIS re-suspension through aeration and mixing, and 7) Controlling the duration of the various tank assembly processes such as fill, reaction, flocculation, settling, AIS wasting, and decant to optimize the process and desired output characteristics. Commercially available timers and controls are described above.

The method may also include a plurality of container assemblies operated with an inlet header and a means for selectively isolating the flow to selected container assemblies. Processing steps in the AIS/SBR Container assembly are described below:

Fill Step. Iron-contaminated fluid enters at least one AIS/SBR tank assembly. Preferably, for an efficient process, the tank is filled to capacity with such iron-contaminated fluid. In some preferred embodiments the iron-contaminated fluid is mixed, aerated or both during the fill step. The temporal duration of the fill step may vary depending on fluid flow rate and characteristics, tank volume and the chemistry of the iron-contaminated fluid. Almost any commercially available timer and control may be used in this step.

Alkaline Addition Optional Step. Alkaline material optionally may be added to an AIS/SBR tank assembly after or during the fill step preferably using a doser assembly (Reference No. 5 on FIG. 1). The amount of alkaline material added to the iron-contaminated fluid in the AIS/SBR tank assembly may vary depending on the chemistry of the iron-contaminated fluid and the amount of alkalinity needed to achieve iron precipitation through the formation of ferric hydroxide solid.

React Step. Oxidation and precipitation occurs in an AIS/SBR tank assembly during the react step. In addition, in cases in which alkaline material is added, the dissolution of the material and the generation of alkalinity occur in conjunction with the oxidation and precipitation of iron. Iron oxides retained in the AIS/SBR Tank Assembly are suspended in fluid providing a surface for heterogeneous ferrous iron oxidation. Iron oxides in suspension during the react step for mine drainage typically range from approximately 200 up to 5,000 mg/L as iron and depend on the chemistry of the iron-contaminated fluid and the mixed fluid in the AIS/SBR tank assembly during the react step. Precipitation of ferric iron produced from the oxidation of ferrous iron is rapid and requires much less time than the ferrous iron oxidation. React durations will vary depending on iron-contaminated fluid ferrous iron concentration, the volume of iron-contaminated fluid to be treated, pH, dissolved oxygen and alkalinity. When the iron-contaminated fluid is mine drainage and standard AIS/SBR tank assemblies are used, the duration of the react period is generally less than two hours.

Flocculation Optional Step. AIS and new iron oxides formed during the react step may benefit from an optional flocculation step to create larger iron oxide particles that settle more readily and easily. The optional flocculation step involves: (i) adding a flocculant (e.g., anionic acrylamide polymer); and (ii) shear mixing to provide a fluid velocity in the reactor equal to or less than 0.001 ft/sec in an AIS/SBR tank assembly for enabling iron oxide particle interaction and agglomeration. Flocculation durations vary depending on the desired output and characteristics of the fluid and particles after the react step. When treating iron-contaminated mine drainage in standard AIS/SBR tank assemblies, this step may last as long as one-half hour in duration.

Settle Step. Iron oxides are removed from suspension in the AIS/SBR tank assembly by substantially ceasing and mixing or aeration treatment of the iron-contaminated fluid. The substantially quiescent conditions in the AIS/SBR Tank Assembly permit AIS and newly formed iron oxides to settle and accumulate in the bottom of an AIS/SBR tank assembly. Settle step durations vary depending on the AIS concentration in the AIS/SBR tank assembly and desired purity of the resulting fluid. When treating iron-contaminated mine drainage in standard AIS/SBR assemblies, this step generally is less than two hours in duration.

Decant Step. Subsequent to the settle step, treated fluid in an AIS/SBR tank assembly is removed from the tank assembly during the decant step. The decant step involves the removal, preferably rapid removal, of substantially clarified supernatant fluid that overlies fluid containing settled AIS. Typically, less than 75% of the fluid in the tank is decanted although both the volume and time of the decant step will vary depending on the desired characteristics of the decanted fluid, the volume of the tank and the rapidity and thoroughness of the settling step. In a preferred embodiment for treating iron-contaminated water, the decant period to remove 75% of the volume of the fluid in the tank wherein the tank is a standard volume, the mine drainage has standard characteristics, the time for the decant step generally is less than one-half hour.

AIS Wasting Step. Excess AIS that results from newly formed iron oxides, is periodically removed from the AIS/SBR tank assembly in a step known as AIS wasting. AIS wasting may occur during any of the above steps and optionally can be conducted during a plurality of steps. The duration, volume of AIS removed, purity of AIS removed and frequency of this step will vary depending on the characteristics of the iron contaminated fluid to be treated, the application and duration of the other steps, the use of optional steps, and the desired characteristics of effluent.

The Sequencing Batch Reactor (SBR) design was developed because it is a very efficient reactor design due to its oxidization of the ferrous iron following batch reactor reaction, which is faster than any other type of reactor design.

An alternative embodiment of the present invention is a Two-Stage Flow-Through AIS System for the treatment of large flow iron-contaminated water (e.g., AMD) flows. The Two-Stage Flow-Through AIS System eliminates the issues related to: 1) the complexity of the pumps, timers, and operation requirements of an SBR system; 2) the large pumps necessary to rapidly fill and decant SBR systems; 3) the need to provide both influent and effluent flow equalization tanks; 4) difficulty to retrofit SBR systems into existing lime-based systems, typically flow-through, that may contain various treatment units including clarifiers; and 5) the lower than anticipated ferrous iron concentrations for a number of AMD discharges. The Two-Stage Flow-Through AIS System uses the heterogeneous oxidation reactions, carbon dioxide mass transport equations (related to pH control), and plug flow & complete mix reactor equations.

Generally there are two types of ideal flow-through reactors in environmental and chemical engineering design, which are plug flow and complete mix reactors. The plug flow reactor equation reflects the most efficient reaction kinetics in a reactor and is the same equation that results in the greater efficiency of batch reactors (e.g., SBR). However, in flow-through reactors, there is no ideal or perfect reactor. All flow-through reactors are a mixture of the two ideal reactors and depending on the design of the reactor, one reactor equation will dominate. The first-order reactor equation for ideal plug flow (PF) reactors is:

$$\phi_{PF} = \frac{1}{k} \times \ln\left(\frac{C_0}{C}\right)$$

and the ideal complete mix (CM) reactor equation is:

$$\phi_{CM} = \frac{C_0 - C}{k \times C}$$

Where θ is detention time, $C_0$ is the initial concentration, C is the final concentration, and k is the first-order reaction rate. The Two-Stage Flow-Through AIS Reactor System is unique and innovative through the use of an AIS treatment method utilizing two non-ideal reactors in a single reactor system.

The stepwise and iterative design method used in the design of the Two-Stage Flow-Through Reactor AIS System is as follows: 1) Step 1 involves the evaluation of the iron-contaminated water chemistry to determine net alkalinity, pH, carbon dioxide acidity, and dissolved oxygen; 2) Step 2 requires a first estimation of reactor sizes and determination of the reactor geometry to establish the aforementioned non-ideal reactors and reactor system and use of the above equations in their relative proportions. For example a weighted factor of 25% plug flow and 75% complete mix reactor the sum of which equals 100%; 3) Step 3 requires the calculation of both reactor carbon dioxide and dissolved oxygen using mass transport calculations and or gas transfer rates available from aeration equipment suppliers (e.g., Siemens FlexDisc™) for the non-ideal reactors and based on the specifics of aeration (e.g., air flow and bubble size); 4) Step 4 involves calculation of each reactor pH from the carbon dioxide and alkalinity concentrations, determined in Step 3, using aqueous chemistry equilibrium equations; 5) Step 5 involves calculation of the pseudo first-order heterogeneous ferrous iron oxidation reaction rates (k) for the non-ideal reactors derived using the target reactor AIS (e.g., 2,000 mg/L) and inputs of dissolved oxygen and pH calculated for each reactor in Step 3 and Step 4 in the complex heterogeneous ferrous iron oxidation equation (s), where pseudo is defined as similar to but not actually the reaction rate; 6) Step 6 uses the k for the non-ideal reactors determined from Step 5 to simultaneously calculate each reactors detention time to achieve the target effluent ferrous iron concentration; and 7) Step 7 is a return to Step 2 to perform sequential and iterative calculations until non-ideal reactor detention times are minimized and are within 2% of the previous iteration. The approach yields a Two-Stage Flow-Through AIS Reactor System that is optimized for the iron-contaminated fluid to be treated.

The approach and method for the Two-Stage Flow-Through AIS Reactor System is innovative and unique, and provides numerous advantages over SBR and a single flow-through complete mix reactor.

The Two-Stage Flow-Through Reactor method yields the efficiency of an SBR and at the approximate reactor size as an SBR. The size similarity is in part due to the SBR requirements that between 30 and 50% of the volume not be decanted to preserve the AIS in the reactor. And this Two-Stage Flow-Through design eliminates the operational complexity of an SBR (i.e., timers and on/off for aeration, mixers, pumps & chemical feeds) as all units are continuous operation with no pumps other than the recirculation (and wasting) of the AIS.

The advantages of the Two-Stage Flow-Through AIS Reactor design method and approach compared to a single reactor design are obvious by comparing computation of reactor sizes to achieve 99% removal of the ferrous iron in an iron-contaminated water with 100 mg/L of ferrous iron, pH of 6.3, and an alkalinity of 250 mg/L. The calculations using water chemistry and the heterogeneous ferrous iron oxidation rate (k) yield a required detention of 7.4 hours for the single reactor compared to 0.75 hours for the Two-Stage Flow-Through AIS Reactor System, which indicates the method developed produces reactor sizes more than 10-fold smaller with the same removal efficiency.

Steps in the process when using a Two-Stage Flow-Through AIS Reactor assembly (see FIGS. 3 and 4) comprise:

1) Inflow step. Iron-contaminated fluid enters or is fed into the Two-Stage Flow-Through AIS reactor assembly, preferably on a continuous basis.

2) An optional Alkaline addition step. Alkaline material optionally is added to the first reactor in the two-stage flow-through AIS tank assembly, preferably on a continuous basis (Reference No. 5 on FIG. 3). The amount of alkaline material applied varies depending on the characteristics of the chemistry of the iron-contaminated fluid and the amount of alkalinity needed to complete the iron precipitation.

3) Oxidation and precipitation Step. Oxidation and precipitation occurs in the AIS reactor(s) (size and number varies). Iron oxides of the Flocculation/Clarifier tank that re-circulate (AIS) to the first reactor are suspended through aeration and mixing to provide a surface for the heterogeneous ferrous iron oxidation. This high iron oxide concentration preferably is maintained by flow-through in the second reactor (see FIG. 4). Iron oxides in suspension in the reactor(s) may be in the range from approximately 200 up to 5,000 mg/L as iron depending on the chemistry of the iron-contaminated fluid and the mixed fluid in the reactor(s). Precipitation of ferric iron produced from the oxidation of ferrous iron is rapid and requires much less time than the ferrous iron oxidation. Reactor(s) volumes and detention times vary depending on iron-contaminated fluid flow, ferrous iron concentration, pH, dissolved oxygen and alkalinity, but usually comprise less than two hours of detention time.

4) Solids removal Step. AIS and new iron oxides formed for example, in the first and second reactors are removed and collected in the flocculation/clarification tank assembly. The flocculation step involves adding a polymer (e.g., anionic acrylamide polymer) and low shear mixing to provide a fluid velocity in the reactor equal to or less than 0.001 ft/sec to enable iron oxide particle interaction and agglomeration. Flocculation durations vary depending on the desired output and characteristics of the fluid and particles after the oxidation step. When treating iron-contaminated mine drainage in the two-stage flow-through tank assembly, this step may last as long as one-half hour. The flocculated iron oxide solids are removed and collected in a clarifier tank where the solids result in a collection of highly concentrated iron oxides ranging from 10,000 to 60,000 mg/L and overflow essentially iron free (90-99.9%) water. The highly concentrated layer of iron oxide continues the oxidation and precipitation of iron and can be employed as a stand-alone unit. The size of the Flocculation/Clarifier tank depends on the flow and chemical characteristics of the water being treated, but is approximately in the range of 500 to 2,000 gallons per day for every square foot of clarifier surface area.

Figure 3:
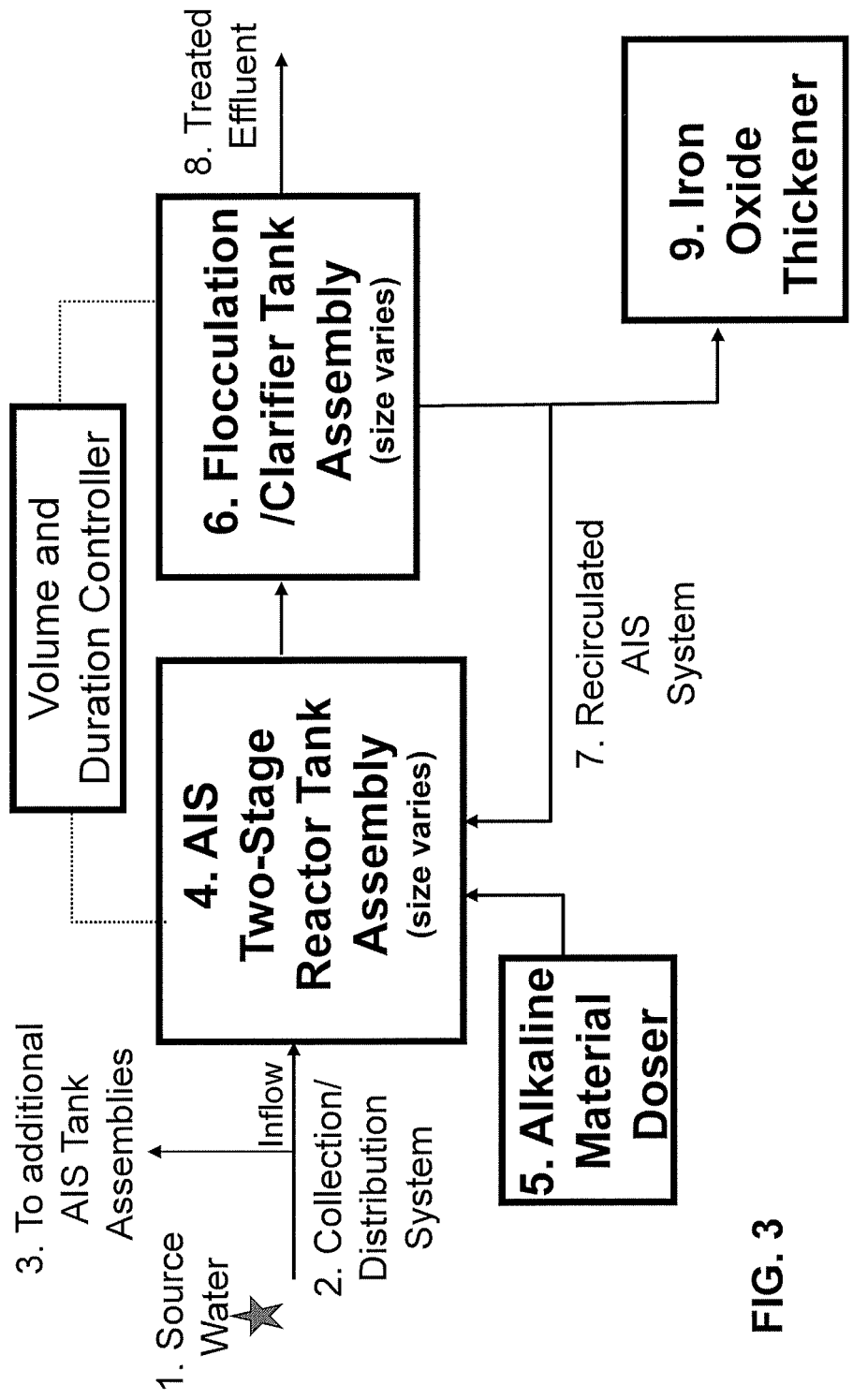
FIG. 3 is a schematic plan view of a Two-Stage Flow-Through AIS treatment system for oxidizing and removing ferrous iron from a flow of iron-contaminated mine water.
Figure 4:
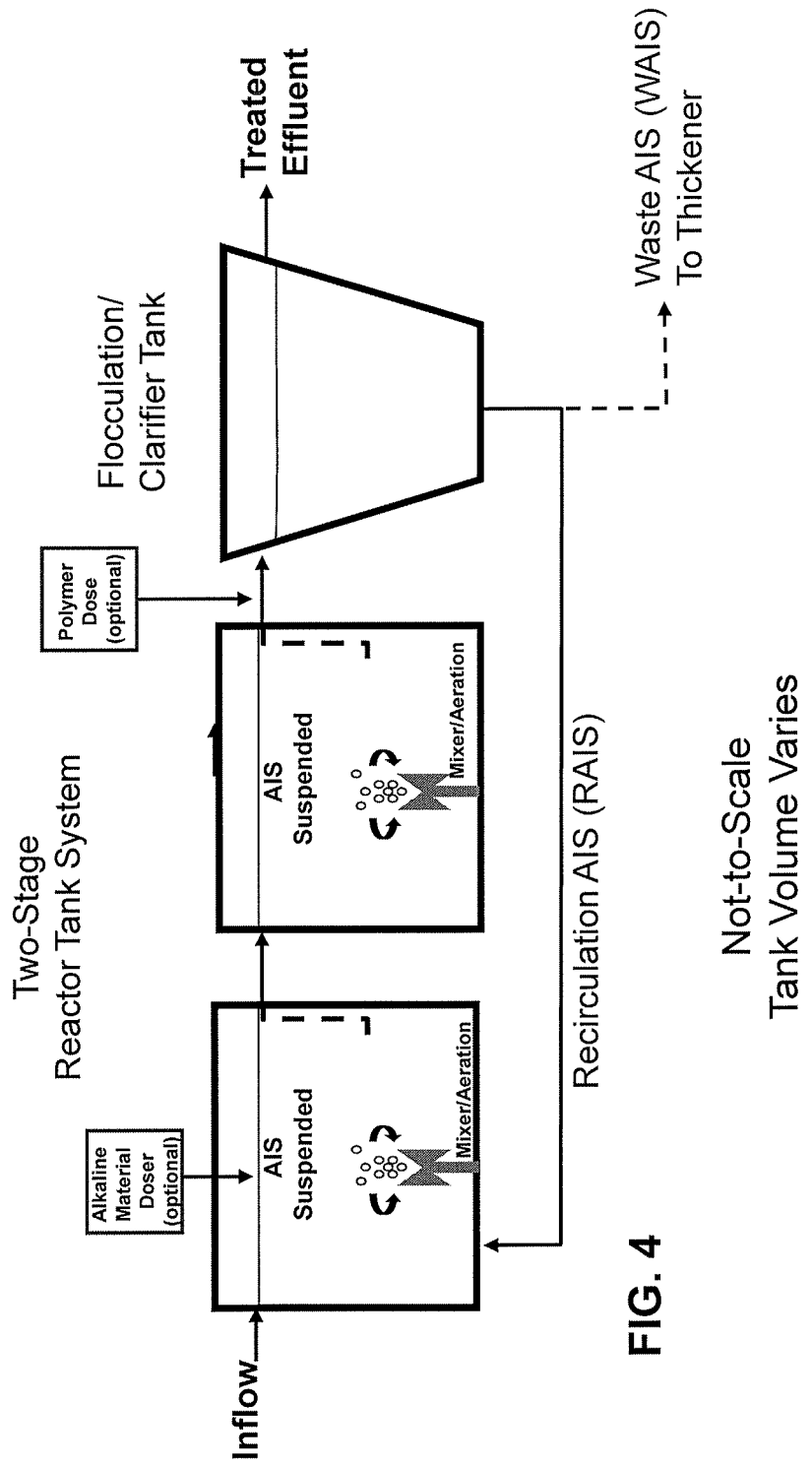
FIG. 4 is a schematic cross-sectional view of embodiment of a Two-Stage Flow-Through AIS tank assembly of FIG. 3.

5) AIS recirculation (RAIS) and wasting (WAIS) Step. AIS collected in the Flocculation/Clarifier tank is continuously re-circulated to the first reactor using a solids pump system (e.g., Seepex progressive cavity pump), or a combination of recirculation to the first reactor and each reactor in the system. The purpose of this AIS re-circulation is to return a concentrated AIS suspension, typically 5,000 to 50,000 mg/L as iron, to the reactors that when mixed with the iron-containing water will provide an AIS concentration in the reactor between 200 and 5,000 mg/L. Excess AIS, a result of newly formed iron oxides, are periodically or continuously removed from the Flocculation/Clarifier tank assembly by diverting the excess AIS to a holding tank or thickener (FIG. 3, Iron Oxide Thickener 9). The amount wasted will depend on the iron-containing water concentration. For example, an iron-contaminated water with a ferrous iron concentration of 25 mg/L, when mixed and reacted with 500 mg/L of AIS will result in a new AIS concentration of 525 mg/L and will require a continuous wasting of approximately 4% of the AIS solids (WAIS) collected in the Flocculation/Clarifier tank assembly. The remainder will be recirculated to the reactor tank assembly. Whereas, the iron-containing water with a ferrous iron concentration of 25 mg/L not mixed and reacted with 500 mg/L of AIS will not remove any of the ferrous iron because the concentration is below 200 mg/L.

In an embodiment of the present invention that employs this method and system, the AIS tank assembly or plurality of AIS Container assemblies is connected to an outlet conduit (Reference No. 8 in FIG. 3) into which treated fluid is discharged from the AIS container assembly. The outlet discharges optionally into a receiving waterbody or an additional treatment system (not shown). Decant fluid or effluent from the AIS Container assembly will have pH greater than 6 and iron concentrations of 5 mg/L or less depending on the effluent criteria or treatment goals.

As mentioned above, the method and system according to the present invention optionally includes an additional method of and system for thickening iron oxides produced by the foregoing method and system. An iron oxide thickening system (FIG. 1, Iron Oxide Thickener 7; FIG. 3, Iron Oxide Thickener 9) comprises: 1) A means of conveying fluids containing iron oxides to a container; 2) A container in which fluids containing iron oxides are retained to provide additional settling time (e.g., between 2 and 48 hours), low shear mixing of the fluid to increase solids, or both; 3) A means of removing (e.g., Seepex progressive cavity pump) concentrated iron oxide solids from the container; and 4) A means of decanting (e.g., Goulds submersible pump) supernatant substantially free of iron solids from the container.

Iron oxide thickening steps of the method of the present invention include: 1) Conveying fluids containing iron oxides to a container; 2) Retaining a fluid containing iron oxides in a container for sufficient time (between 2 and 48 hours) for iron oxides to concentrate in the fluid by removal of water accomplished by providing additional settling time, low shear mixing of the fluid containing iron oxide to increase the removal of water, or to both settle and mix such fluids; 3) Removing concentrated iron oxide solids from the container; and 4) Decanting a supernatant substantially free (90%-99.9%) of iron solids from the container.

In an embodiment of the present invention that employs this method and system, waste activated iron solids (WAIS), the excess AIS produced by an iron oxidation treatment method or system according to the present invention, is directed into a thickener (e.g., tank. Such fluid can be directed into the thickener by using a variety of means including pumps, gravitational force, a combination of both, or other means. See, step 7 in FIG. 1 and step 9 in FIG. 3. The thickening step decreases the fluid content of the iron oxide solids and thereby increases the solid content of the iron oxide solids. The iron oxide thickener consists of a tank assembly containing a supernatant decant pump and a solid recovery pump. The tank assembly may also provide a means for mixing the fluid to aid in removing excess water from the iron oxide solids. Iron oxides resulting from such a step and system typically have a solid content up to 40%. Solids recovered from such processes and systems have commercial reuse potential.

Iron-Containing Water Treatment Solids Reuse.

The solids produce from the treatment or iron-containing water are primarily iron oxides in various amorphous and crystalline forms, but depending on the water chemistry and treatment process there may be various contaminants. The most common contaminant is calcium carbonate and is directly a result of the use of lime and the high pH typical of lime treatment. The low density and levels of contamination affect the reuse of the solids produced from the treatment of iron-containing water.

The AIS treatment process produces solids with unique characteristics. Based on field testing the solids produced can contain solids greater than 30% and with iron oxide concentrations exceeding 95%, on a dry weight basis. This potential can be better understood by comparing to lime-based solids that have solids content of less than 10% and contain between 20 and 60% iron oxide, on a dry weight basis. The lime-based treatment solids will also contain 30 to 80% calcium carbonate from the use of lime and may contain additional metal contaminants including aluminum, manganese, and zinc.

The described solids characteristics produced by AIS treatment may increase the potential market-value and reuse of the solids in various applications. The potential applications for AIS treatment solids include: 1) Metallurgical—used in steel production and the powdered metal industry; 2) Corrosion Inhibitor in Concrete—an additive to inhibit reinforcing bar chloride corrosion in concrete; 3) Environmental—various uses in pollution abatement including phosphorous removal and trace metal sorption in wastewater treatment; 4) Pigments/Colors—use as a pigment in various materials including masonry, concrete and paints; and 5) Agricultural Soil Amendment—soil amendment to bind in the soil and prevent runoff of phosphorous.

EXAMPLE

Two-Stage Flow-Through AIS System Design

Provided herein is an example of the design methodology for the Two-Stage Flow-Through AIS Treatment Approach for a high flow, iron-contaminated abandoned deep mine discharge located in southwest Pennsylvania. The example is not intended to limit the scope of the invention. The deep mine discharge chemistry is provided in Table 1 and indicates the deep mine discharge has elevated ferrous iron concentration, pH of 6.1, and is net alkaline. This net alkalinity is determined using information provided in the application and is reflected in the alkalinity to ferrous ratio being greater than 1.7. The pH and alkalinity indicate the discharge contains elevated carbon dioxide acidity with the pH and alkalinity indicating a calculated concentration of approximately 350 mg/L, which is important as this affects the pH in the reactors and the required aeration.

TABLE 1

Iron-Contaminated Abandoned Mine Discharge Characteristics

| Ave. Flow gals/min | Temp. ° C. | Dissolved Oxygen mg/L | pH | Total Fe mg/L | $Fe^{2+}$ mg/L | Alkalinity mg/L (as $CaCO_3$) | $CO_2$ Acidity mg/L (as $CaCO_3$) |
|---|---|---|---|---|---|---|---|
| 4,800 | 14.9 | 0.24 | 6.1 | 47.7 | 47.6 | 238 | 350 |

To determine size or detention times of the Two-Stage Flow-Through Reactor System a number of iterative steps are required as indicated previously. The mine discharge chemistry is evaluated to determine concentrations of carbon dioxide and the changes in pH that will occur with the removal of the carbon dioxide during aeration in the reactors. The pH will increase across each reactor and approach 7 in the effluent as this carbon dioxide is removed. The dissolved oxygen is determined based on the aeration with a minimum concentration of 2 mg/L and maximum concentration of 10 mg/L, which is the approximate dissolved oxygen saturation in water. For the above type of water aeration is primarily to adjust and control pH with the dissolved oxygen typically near saturation. AIS concentration of 2,000 mg/L is expected to be maintained in the Two-Stage Flow-Through Reactor System through recirculation of solids from the clarifier and mixing in the Two-Stage Flow-Through Reactor System. The pH, dissolved oxygen, and AIS concentration are input into heterogeneous ferrous iron oxidation model to determine kinetic rates (k). This is followed by a calculation of the detention times using the weighted complete mix and plug flow reactor equations along with the influent ferrous iron concentrations and the desired effluent concentrations. The initial detention time estimates are used in an iterative calculation to re-determine pH, dissolved oxygen, in order to recalculate the kinetic rates (k) and the reactor detention times until calculated detention times from successive iterations are within 2%.

Table 2 summarizes the design results for the Two-Stage Flow-Through AIS system to treat the mine discharge and the anticipated effluent water quality. The detention times are short ranging from a combined 0.8 to 1.2 hours in the Two-Stage Flow-Through Reactor System. Note the actual volume of each reactor can be calculated by multiplying the detention time by the flow rate, which yields 288,000 gallons for the Two-Stage Flow-Through Reactor System. In combination with the flocculation/clarifier tank system the modeled performance of the Two-Stage Flow-Through AIS system shows near complete removal of the ferrous iron under average flow conditions (>99% iron removal) and maximum flow conditions (>98% iron removal). The design and performance results in Table 2 have been demonstrated in pilot-scale studies.

TABLE 2

Summary of design information and anticipated effluent water quality of the Two-Stage Flow-Through AIS treatment system.

| Condition | Flow gpm | Reactor 1 DT Hrs | Reactor 2 DT Hrs | Clarifier Loading ft/d | Anticipated Effluent Quality | | | |
|---|---|---|---|---|---|---|---|---|
| | | | | | pH | Total Fe mg/L | Dissolved Fe mg/L | Alkalinity mg/L |
| Average | 4,000 | 0.6 | 0.6 | 50 | 6.7 | <0.5 | <0.1 | 120 |
| Maximum | 6,300 | 0.4 | 0.4 | 80 | 6.5 | <1.0 | <0.3 | 120 |

A pilot study was conducted at this site and the results from this pilot study are provided in Table 3 for a Two-Stage Flow-Through Reactor detention time of 0.9 hours. The ferrous iron is substantially removed by the Two-Stage Flow-Through AIS Reactor System (>99% removal) through the heterogeneous ferrous iron oxidation process. The effluent from the clarifier shows the AIS is recovered for recirculation and the effluent from the Two-Stage Flow-Through AIS pilot unit is substantially free of iron with total iron removal of 98%, compared to influent total iron concentration. In addition, the results of the pilot study are consistent with the design methodology used for this discharge and contained in Table 2.

TABLE 3

Summary of AIS pilot testing at an iron-contaminated flow of 80 gpm, Air Flow = 18 cfm and polymer dose 0.25 mg/L on Oct. 6, 2007.

| Location | pH | Dissolved Oxygen mg/L | Temp. °C. | Total Iron mg/L | Ferrous Iron mg/L |
|---|---|---|---|---|---|
| Influent | 6.10 | 0.2 | 15.0 | 47.4 | 47.6 |
| Reactor System | 6.51 | 8.4 | 15.3 | 2,300 | 0.03 |
| Clarifier | 6.47 | 8.4 | 15.4 | 1.05 | 0.01 |
| Recirculated AIS | — | — | — | 9,200 | — |

Alternative embodiments of the present invention can include a plurality of tanks for the SBR system, and a plurality of first and second tanks for the Two-Stage Flow-Through AIS system. Iron-containing fluid can be selectively simultaneously or sequentially directed into the tanks of the SBR system and the plurality of first and/or second tanks for the Two-Stage Flow-Through AIS system.

It will be understood from the above description that the present invention is related to a new device and treatment process for iron-contaminated water, such as mine drainage. This process and device may decrease the treatment area or volume or construction costs compared to passive treatment approaches; and decrease treatment costs compared to conventional chemical treatment through the elimination of the use of costly chemicals (e.g., lime and polymers) or their replacement with lower cost chemicals (e.g. pulverized limestone). The process may prove to be an economical alternative to both current passive treatment and chemical treatment approaches. The process has the added benefit of producing a relatively pure and easier to recover iron oxide solid that may have commercial value.

Although preferred embodiments of the invention have been described in detail herein, it will be appreciated by those skilled in the art that various modifications and alternatives to the preferred embodiments may be developed in light of the overall teaching of the disclosure. Accordingly, the particular arrangements are illustrative only and are not limiting as to the scope of the invention, which is to be given full breadth of the amended claims and any and all equivalents thereof.

What is claimed is:

1. A Sequential Batch Reactor method of removing ferrous iron from an iron-containing fluid comprising the method steps of:

a. filling a tank with the iron-containing fluid;

b. introducing activated iron solids into the tank;

c. mechanically aerating the iron-containing fluid within the tank sufficiently to ensure adequate oxygen for ferrous iron oxidation;
d. mechanically mixing the iron-containing fluid within the tank to maintain the activated iron solids in suspension;
e. oxidizing ferrous iron in a heterogeneous ferrous iron oxidation process,
    wherein the activated iron solids are used as a catalyst,
    wherein the heterogeneous ferrous iron oxidation process creates additional activated iron solids;
f. resuspending the activated iron solids and the additional activated iron solids to maintain the heterogeneous iron oxidation process, wherein the additional activated iron solids are used as a catalyst;
g. controlling a duration of steps c through f to achieve heterogeneous ferrous iron oxidation of ferrous iron in the iron-containing fluid;
h. collecting activated iron solids within the tank; and
i. decanting a substantially iron-free supernatant fluid from the tank.

2. The method according to claim 1, wherein the step of filling further comprises filling a plurality of tanks with the iron-containing fluid.

3. The method according to claim 2, wherein the step of filling further comprises selectively directing simultaneously the iron-containing fluid into the plurality of tanks for treatment.

4. The method according to claim 2, wherein the step of filling further comprises selectively directing sequentially the iron-containing fluid into the plurality of tanks for treatment.

5. The method according to claim 1, further comprising the step of adding to the tank a sufficient quantity of alkaline-bearing material selected from the group consisting of a pulverized limestone, a hydrated lime, a quick lime and a caustic soda for neutralizing the acidity associated with precipitation of ferric iron produced by the AIS process and based on an alkalinity (mg/L as $CaCO_3$) to iron (mg/L as Fe) ratio of less than about 1.7 in the iron-containing fluid.

6. The method according to claim 1, wherein:
    the step of mechanically mixing the iron-containing fluid within the tank to maintain the activated iron solids in suspension, further comprises maintaining the activated iron solids in suspension at concentrations greater than 200 mg/L as iron; and
    the step of collecting activated iron solids within the tank, further comprises maintaining the activated iron solids and additional activated iron solids at concentrations greater than 200 mg/L as iron.

7. The method according to claim 1, further comprising the step of conveying excess activated iron solids to an iron oxide settling system to collect and thicken suspended solids to form a product.

8. The method of claim 1, wherein the activated iron solids comprise ferrihydrite.

9. A Two-Stage Flow-Through AIS method of removing ferrous iron from an iron-containing fluid comprising the method steps of:
    a. feeding a first tank with the iron-containing fluid;
    b. mechanically aerating the iron-containing fluid within the first tank sufficiently to ensure adequate oxygen for ferrous iron oxidation;
    c. mechanically mixing the iron-containing fluid within the first tank sufficiently to maintain a suspension of activated iron solids at concentrations greater than 200 mg/L as iron necessary to catalyze ferrous iron oxidation by a heterogeneous ferrous iron oxidation process;
    d. oxidizing ferrous iron in a heterogeneous ferrous iron oxidation process to form a first processed fluid,
        wherein the heterogeneous ferrous iron oxidation process creates additional activated iron solids;
    e. conveying the first processed fluid to a second tank;
    f. mechanically aerating the iron-containing fluid within the second tank sufficiently to ensure adequate oxygen to complete ferrous iron oxidation;
    g. mechanically mixing the iron-containing fluid within the second tank sufficiently to maintain a suspension of activated iron solids at concentrations greater than 200 mg/L as iron necessary to catalyze ferrous iron oxidation by a heterogeneous ferrous iron oxidation process to form a second processed fluid essentially free of ferrous iron;
    h. conveying the second processed fluid to a third tank to flocculate and collect the activated iron solids and the additional activated iron solids in the third tank to form a processed fluid;
    i. returning the collected activated iron solids and additional activated iron solids to the first tank sufficiently to maintain high reactor activated iron solids concentrations necessary to catalyze ferrous iron oxidation;
    j. removing a substantially iron-free supernatant fluid from the third tank; and
    k. removing excess activated iron solids from the third tank.

10. The method according to claim 9, wherein the step of feeding further comprises the step of feeding a plurality of first tanks with the iron-containing fluid.

11. The method according to claim 10, wherein the step of feeding further comprises the step of selectively directing simultaneously the iron-containing fluid into the plurality of first tanks for treatment.

12. The method according to claim 10, wherein the step of feeding further comprises the step of selectively directing sequentially the iron-containing fluid into the plurality of first tanks for treatment.

13. The method according to claim 9, further comprising the step of adding to the first tank or feed water to the first tank a sufficient quantity of alkaline-bearing material selected from the group consisting of a pulverized limestone, a hydrated lime, a quick lime and a caustic soda for neutralizing the acidity associated with the ferric iron produced by the AIS process and based on an alkalinity (mg/L as $CaCO_3$) to iron (mg/L as Fe) ratio of less than about 1.7 in the iron-containing fluid.

14. The method according to claim 10, further comprising the step of conveying the first processed fluid to a plurality of second tanks from the plurality of first tanks to continue treatment.

15. The method according to claim 10, further comprising the step of conveying the first processed fluid to a plurality of third tanks from a plurality of second tanks to promote flocculation and collection of the activated iron solids and the additional activated iron solids; and returning the activated iron solids and the additional activated iron solids to the plurality of first tanks sufficiently to maintain high reactor activated iron solids concentrations in excess of 200 mg/L as iron necessary to effectively catalyze ferrous iron oxidation.

16. The method according to claim 9, wherein:
    the mechanical mixing of the iron-containing fluid within the first tank sufficiently to maintain a suspension of activated iron solids necessary to catalyze ferrous iron oxidation by a heterogeneous ferrous iron oxidation process; further comprising maintaining the suspension of activated iron solids at concentrations greater than 200 mg/L as iron; and the step of returning the collected activated iron solids and the additional activated iron solids to the first tank sufficiently to maintain high reactor activated iron solids concentrations necessary to catalyze ferrous iron oxidation; further comprising maintaining the high reactor activated iron solids at concentrations greater than 200 mg/L as iron.

17. The method according to claim 9, further comprising the step of conveying the excess activated iron solids from the second tank to an iron oxide settling system to collect and thicken suspended solids to form a product.

18. The method of claim 9, wherein the activated iron solids comprise ferrihydrite.

* * * * *